United States Patent
Daley et al.

(10) Patent No.: US 9,323,515 B1
(45) Date of Patent: Apr. 26, 2016

(54) NETWORK WITH BROKER FOR DEVICE MANAGEMENT

(75) Inventors: Robert C. Daley, Nashua, NH (US); Sunil Marolia, Dana Point, CA (US); Vivek Kapadekar, Laguna Niguel, CA (US); Bindu R. Rao, Laguna Niguel, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 2364 days.

(21) Appl. No.: 11/039,000

(22) Filed: Jan. 18, 2005

Related U.S. Application Data

(60) Provisional application No. 60/537,374, filed on Jan. 16, 2004.

(51) Int. Cl.
  *G06F 15/16* (2006.01)
  *G06F 9/445* (2006.01)
  *H04L 29/08* (2006.01)

(52) U.S. Cl.
  CPC . *G06F 8/65* (2013.01); *H04L 67/34* (2013.01)

(58) Field of Classification Search
  CPC .................................. H04L 67/34; G06F 8/65
  USPC ................... 709/221, 219; 717/171, 172, 176
  See application file for complete search history.

(56) References Cited

U.S. PATENT DOCUMENTS

| | | | |
|---|---|---|---|
| 5,261,055 A | 11/1993 | Moran et al. | |
| 5,442,771 A | 8/1995 | Filepp et al. | |
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |
| 5,878,256 A | 3/1999 | Bealkowski et al. | |
| 5,960,189 A * | 9/1999 | Stupek et al. .................. | 717/169 |

(Continued)

FOREIGN PATENT DOCUMENTS

| | | |
|---|---|---|
| CA | 2339923 | 3/2000 |
| JP | 8202626 | 8/1996 |

(Continued)

OTHER PUBLICATIONS

Smith, David K.; "Gap Analysis Issues"; Dec. 24, 2003; Doc# OMA-DM-2003-0213-Gap_Analysis_Issues; Open Mobile Alliance Ltd.; pp. 1-8.*

(Continued)

*Primary Examiner* — Viet Vu
(74) *Attorney, Agent, or Firm* — Kilpatrick Townsend & Stockton LLP

(57) ABSTRACT

A network having a device management server to execute Sync ML device management (DM) commands and manage associated mobile devices. The network may employ a broker to execute bundles comprising device management and provisioning activities, provisioning parameters etc. The broker may determine the sequence in which these device management and provisioning activities are executed and may employ the device management server to conduct the DM operations to interact with the associated mobile devices.

16 Claims, 4 Drawing Sheets

(56) References Cited

U.S. PATENT DOCUMENTS

| | | | |
|---|---|---|---|
| 5,960,445 | A | 9/1999 | Tamori et al. |
| 6,009,497 | A | 12/1999 | Wells et al. |
| 6,038,636 | A | 3/2000 | Brown, III et al. |
| 6,064,814 | A | 5/2000 | Capriles et al. |
| 6,073,206 | A | 6/2000 | Piwonka et al. |
| 6,073,214 | A | 6/2000 | Fawcett |
| 6,088,759 | A | 7/2000 | Hasbun et al. |
| 6,105,063 | A | 8/2000 | Hayes, Jr. |
| 6,112,024 | A | 8/2000 | Almond et al. |
| 6,112,197 | A | 8/2000 | Chatterjee et al. |
| 6,126,327 | A | 10/2000 | Bi et al. |
| 6,128,695 | A | 10/2000 | Estakhri et al. |
| 6,157,559 | A | 12/2000 | Yoo |
| 6,163,274 | A | 12/2000 | Lindgren |
| 6,198,946 | B1 | 3/2001 | Shin et al. |
| 6,279,153 | B1 | 8/2001 | Bi et al. |
| 6,311,322 | B1 | 10/2001 | Ikeda et al. |
| 6,438,585 | B2 | 8/2002 | Mousseau et al. |
| 6,505,228 | B1 * | 1/2003 | Schoening et al. ........... 718/106 |
| 6,647,260 | B2 * | 11/2003 | Dusse ..................... H04L 67/16 455/411 |
| 7,117,195 | B2 * | 10/2006 | Chantrain et al. ................ 707/1 |
| 7,143,153 | B1 * | 11/2006 | Black et al. .................... 709/223 |
| 7,210,010 | B2 * | 4/2007 | Ogle ............................ 711/162 |
| 7,363,260 | B1 * | 4/2008 | Stamler et al. .................. 705/28 |
| 2001/0029178 | A1 | 10/2001 | Criss et al. |
| 2001/0047363 | A1 | 11/2001 | Peng |
| 2001/0048728 | A1 | 12/2001 | Peng |
| 2002/0078209 | A1 | 6/2002 | Peng |
| 2002/0090934 | A1 * | 7/2002 | Mitchelmore ................ 455/412 |
| 2002/0116261 | A1 | 8/2002 | Moskowitz et al. |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 | 10/2002 | Anton, Jr. |
| 2002/0198971 | A1 * | 12/2002 | Resnick et al. ............. 709/221 |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2003/0172138 | A1 * | 9/2003 | McCormack et al. ........ 709/220 |
| 2003/0172175 | A1 * | 9/2003 | McCormowitz et al. ........ 709/232 |
| 2004/0003097 | A1 * | 1/2004 | Willis et al. ................... 709/228 |
| 2004/0039801 | A9 * | 2/2004 | Srinivasan et al. ............ 709/221 |
| 2004/0098715 | A1 * | 5/2004 | Aghera et al. ................ 717/173 |
| 2004/0117257 | A1 * | 6/2004 | Haberman et al. ............. 705/14 |
| 2004/0143836 | A1 * | 7/2004 | McCormack et al. ........ 719/316 |
| 2010/0042708 | A1 * | 2/2010 | Stamler et al. ................ 709/221 |

FOREIGN PATENT DOCUMENTS

| | | |
|---|---|---|
| KR | 2002-0034228 | 5/2000 |
| KR | 2001-0100328 | 11/2001 |
| WO | WO-0241147 A1 | 5/2002 |

OTHER PUBLICATIONS

Shen et al; "Profile-Based Subscriber Service Provisioning"; 2002; IEEE; Network Operations and Management Symposium; pp. 561-574.*

Merriam-Webster; "Definition for 'Document'"; 2011; Merriam-Webster, Inc.; pp. 1-2 retrieved at http://www.merriam-webster.com/dictionary/document on Oct. 17, 2011.*

W3C; "Extensible Markup Language (XML) 1.0 (Fifth Edition)"; Nov. 26, 2008; www.w3.org; v1.0, 5th edition; pp. 1-36; retrieved at http://www.w3.org/TR/REC-xml/ on Oct. 17, 2011.*

"Focus on OpenView a guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

\* cited by examiner

NETWORK WITH BROKER FOR DEVICE MANAGEMENT

RELATED APPLICATIONS

This patent application makes reference to, claims priority to and claims benefit from U.S. Provisional Patent Application Ser. No. 60/537,374, entitled "Network with Broker for Device Management," filed on Jan. 16, 2004.

The complete subject matter of the above-referenced United States Provisional Patent Application is hereby incorporated herein by reference, in its entirety. In addition, this application makes reference to U.S. Provisional Patent Application Ser. No. 60/523,047, entitled "Network that Supports User-Initiated Device Management," filed Nov. 17, 2003, U.S. Provisional Patent Application Ser. No. 60/249,606, entitled "System and Method for Updating and Distributing Information," filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Problems often arise while conducting updates of firmware/software in such electronic devices, problems such as, for example, managing the millions of devices that require firmware upgrades and provisioning of applications. Sometimes there can be problems in determining the existing firmware version of devices and mapping them to device capabilities.

Electronic devices may use update packages containing information necessary to update firmware/software in electronic devices. Update packages may be downloaded into handsets such that their software and/or firmware could be updated. Executing instructions in update packages can take a significant amount of time, which may be bothersome to users of electronic devices.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a network and method that facilitate managing associated electronic devices. The network may comprise a management server that manages the electronic devices in the network; a first manager that creates bundles of actions for the electronic devices; and a broker that determines a sequence of execution of the actions in the electronic devices, wherein the broker utilizes the management server to interact with the electronic devices. In an embodiment of the present invention, an electronic device may comprise at least one of a mobile handset, a cellular telephone, a pager, a personal computer, and a personal digital assistant (PDA).

In an embodiment of the present invention, the first manager may interface to a second manager to retrieve information about the electronic devices in the network. The second manager may comprise a component external to the network.

In an embodiment of the present invention, the actions may comprise electronic device management and provisioning activities and/or updating firmware in the electronic devices.

In an embodiment of the present invention, the broker may retrieve information about the electronic devices in the network to determine the sequence of execution of the actions. The broker may determine the sequence in which the electronic devices receive the bundles of actions for execution. The bundle of actions may comprise a sequence of operations to be executed by recipient electronic devices. The broker may receive a signal from each electronic device upon completion of execution of the actions in the electronic device, and the broker may signal to the management server the completion of execution of actions in the electronic devices.

The method that facilitates managing associated electronic devices may comprise receiving a request to update at least one of a plurality of electronic devices in a network; creating a bundle of actions for the at least one of a plurality of electronic devices to perform; determining a sequence of execution of the actions in each of the at least one of a plurality of electronic devices; reporting a status of the execution of the actions in each of the at least one of a plurality of electronic devices; and signaling completion of the execution of the action in each of the at least one of a plurality of electronic devices.

In an embodiment of the present invention, creating the bundle of actions may comprise retrieving information about the at least one of a plurality of electronic devices, and creating a sequence of operations to be executed in the at least one of a plurality of electronic devices based on the retrieved information.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to updating firmware/software in an electronic device such as, for example, a mobile handset in a carrier network. More specifically, the present invention relates to updating firmware/software components in electronic devices using a device management solution and using a broker for device management (DM) in the network. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices.

Figure 1:
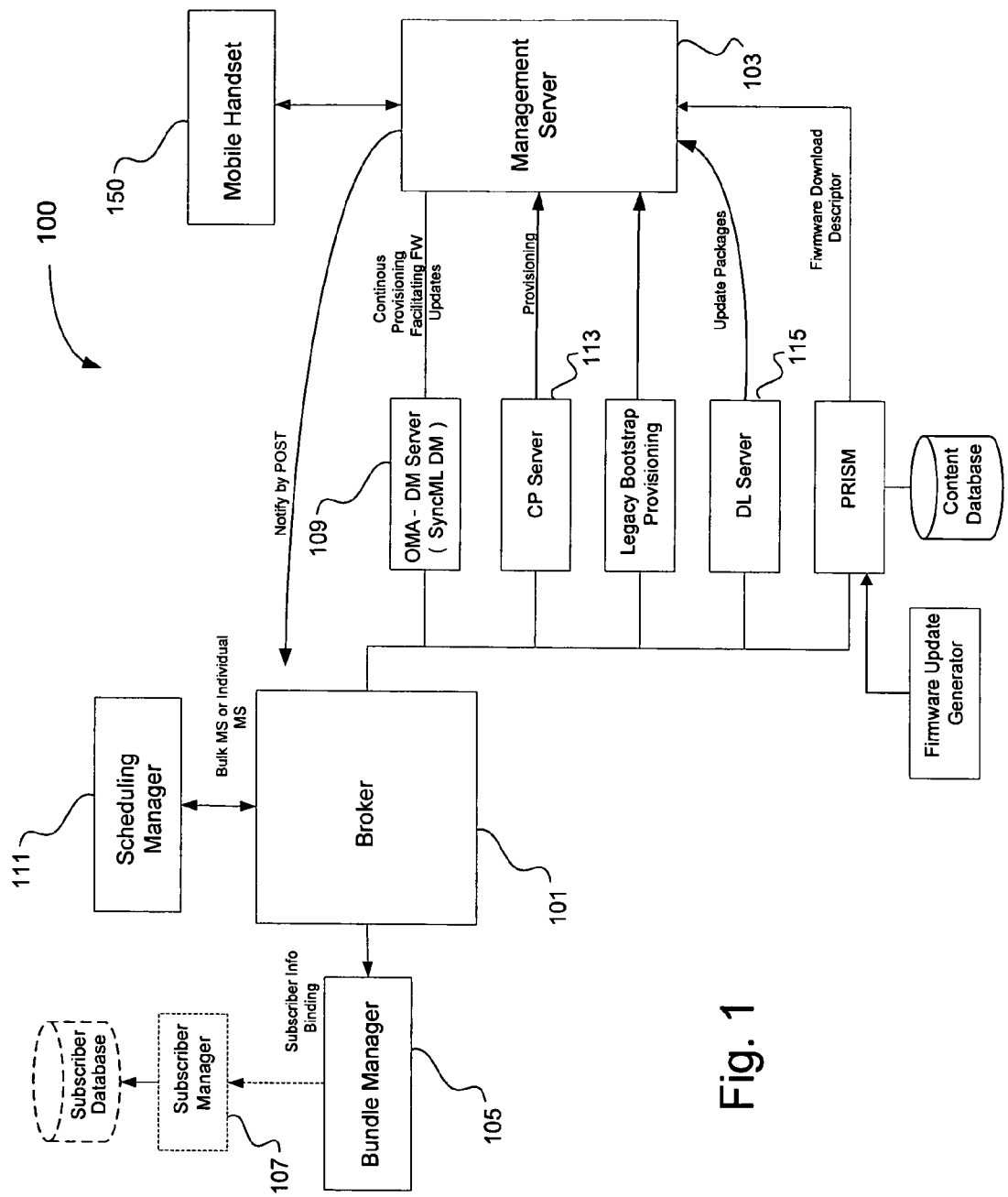
FIG. 1 illustrates a block diagram of an exemplary mobile handset network, in accordance with an embodiment of the present invention.

FIG. 1 illustrates a block diagram of an exemplary mobile handset network 100, in accordance with an embodiment of the present invention. The mobile handset network 100 may employ a broker 101 and a device management server 103. In an embodiment of the present invention, the broker 101 may effectuate executing bundles of provisioning information, firmware updates and content in order to manage mobile handsets such as, for example, the mobile handset 150, in the mobile handset network 100. In an embodiment of the present invention, updates to firmware/software in the mobile handset 150 may be accomplished using an update package, wherein such an update package may comprise executable instructions used to convert firmware/software in the mobile handset 150 from one version to another.

In an embodiment of the present invention, the network 100 may have a device management server 103, which may execute SyncML DM commands and manage the mobile handsets in the network 100. The network 100 may employ the broker 101 to execute bundles that may comprise device management and provisioning activities, provisioning parameters, etc. The broker 101 may determine the sequence in which these device management and provisioning activities should be executed. The broker 101 may also employ the device management server 103 to conduct the DM operations to interact with the associated mobile handset such as, for example, the mobile handset 150. The broker 101 may employ a bundle manager 105 to define bundles and create instances of bundles.

The bundle manager 105 may transform a bundle template into final form, given up-to-date make, model, and version information. The bundle manager 105 may interface to a subscriber manager such as, for example, the subscriber manager 107 to retrieve subscriber-specific information. The subscriber manager 107 may be an external component, which may be provided by, for example, a carrier capable of providing subscriber-specific information that may be needed for complete application provisioning.

In an embodiment of the present invention, the broker 101 may drive the DM activities that the DM server 103 may execute. In an embodiment of the present invention, the DM server 103 may be a DM protocol gateway and it may support the Sync ML DM protocol for communicating with, and managing the mobile handset.

In an embodiment of the present invention, the broker 101 may be designed to manage the delivery of various forms of parameters and content to mobile handsets in the network 100 using available provisioning, device management, and download protocols. The broker 101 may be designed to manage delivery using protocols such as, for example, Open Mobile Alliance (OMA) DM, OMA Download, and OMA Client Provisioning protocols. In an embodiment of the present invention, the broker 101 may be designed to support additional protocols such as, for example, Wireless Application Protocol (WAP) 183, Nokia OTA, and Openwave PP.

The broker 101 may be a "middleware" component that may allow higher-level software to perform various firmware and software provisioning operations across multiple download and provisioning protocols. The broker 101 may allow a caller to execute an update bundle of download and provisioning operations to be carried out on one or more mobile handsets 150. The bundles may be represented by, for example, Extensible Markup Language (XML) documents that specify sequences of multiple operations to be performed on a given device type in a specific order. A bundle may be a collection of device initialization, upgrade, and application provisioning steps to be executed in sequence across the protocols needed to achieve the needed changes.

Figure 2:
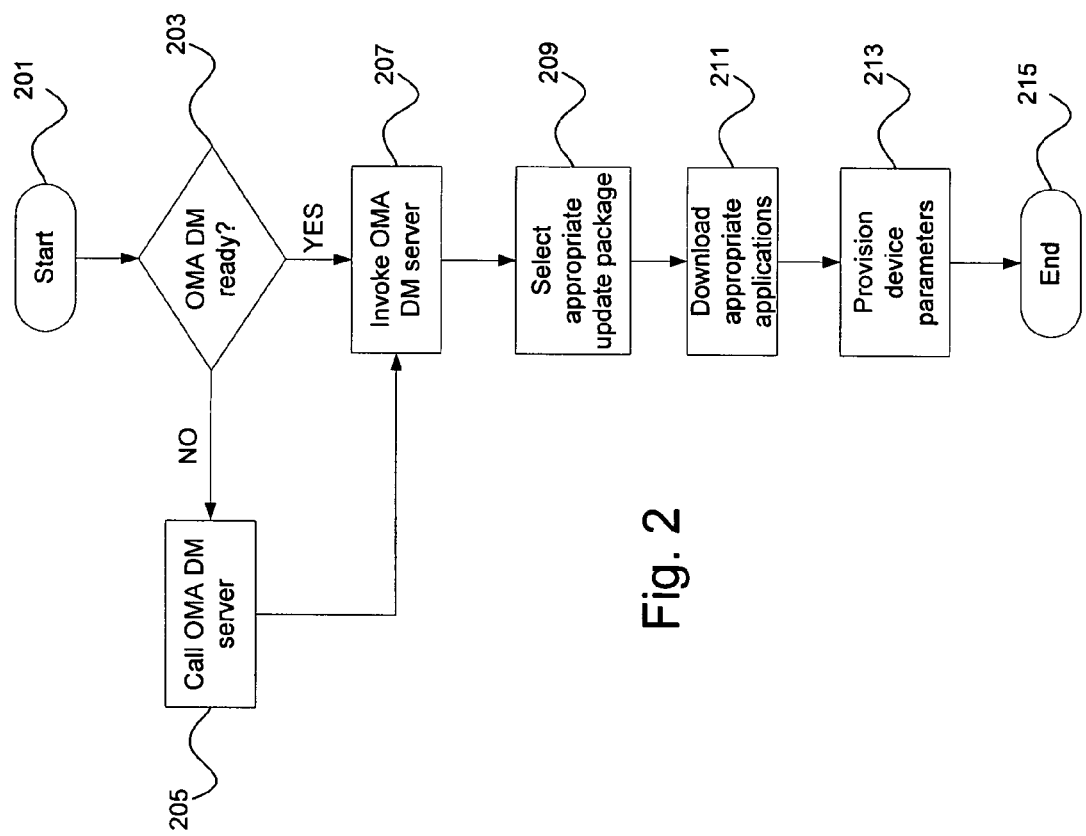
FIG. 2 illustrates an exemplary sequence of operations comprising a bundle used in initializing a new device, in accordance with an embodiment of the present invention.

FIG. 2 illustrates an exemplary sequence of operations comprising a bundle used in initializing a new device, in accordance with an embodiment of the present invention. The operation of the bundle may begin at a start block 201. The sequence of FIG. 2 may check whether the device is "OMA DM ready" at a next step 203, and if the device is "OMA DM ready" then the process may proceed to a next step 207. If the device is not "OMA DM ready", an OMA DM server may be called to bootstrap the device to enable OMA DM device management operations at a next step 205, and then the sequence may go on to a next step 207.

At a next step 207, the OMA DM server may be invoked to discover the device identification, make, model, and "version" information. In an embodiment of the present invention, "version" identification may involve the retrieval of multiple values such as, for example, firmware version, software version, flex version, etc. An appropriate firmware upgrade package needed to update the device with the appropriate firmware may then be selected based on the current firmware version and localization information as specified by the update bundle at a next step 209. The firmware may be downloaded using an OMA download protocol, and the device may be updated and rebooted with the updated firmware.

At a next step 211, new applications and a new screen saver based on information provided within the update bundle may be downloaded. Then, using the appropriate protocol, (e.g., OMA DM, OMA Client Provisioning, WAP, etc.) the device application parameters such as browser settings, bookmarks, multimedia messaging service (MMS) parameters, etc., may be provisioned at a next step 213. The sequence of the bundle operations may then end at an end block 215.

The specific operations that make up a bundle may be specific to a device type, firmware version, resulting capabilities, carrier specified subscriber plans and subscriber-selected options. Bundles may, as a result, be created as "bundle templates", which may later be processed into final form, once a device is identified, and the firmware is updated to a known set of capabilities.

Referring again to FIG. 1, the broker 101 may use the bundle manager 105 to process the bundle templates into final form, given the up-to-date set of device capabilities resulting from the device identification/firmware upgrade process. The bundle manager 105 may also add any subscriber-specific application options and related values such as, for example, email user ID's and passwords, in creating the final form bundle. Subscriber-specific data may be processed into the final bundle by substituting subscriber-specific values for placeholder tokens in the bundle template.

The broker 101 may provide an interface that may allow a caller to initiate a "job" to apply a template bundle to one or more devices, as may be specified by one or more mobile handset numbers (mobile subscriber integrated services digital network (MSISDN) number, mobile identification number (MIN), etc.). The actual device type and version information may be retrieved prior to the creation of the final bundle.

Each job may be assigned a unique "job ID" for the purpose of reporting status for a specific job. Upon completion of the entire sequence of operations, the caller may be notified via a "callback" to report job status to a specified universe resource locator (URL). During the execution of the job, the caller may invoke the broker to retrieve intermediate status concerning the state of the job, using the job ID.

In an embodiment of the present invention, the broker 101 may, for example, be responsible for managing all operations across all protocols, as needed, to execute the entire sequence of operations contained within the final bundle. The sequence of operations in the final bundle may include all possible error recovery, with restart immediately following the last successfully completed operation. Additionally, each operation within a bundle may specify whether an unrecoverable error at a specific step in the sequence should abort the remaining operations or simply move on to the next step in the sequence, for example.

The broker 101 may be invoked by a higher-level component to upgrade and provision mobile handsets in the network 100 as defined by their mobile phone numbers, for example. This action may be triggered by several situations such as, for example, when a new subscriber is detected on the network. Another situation may be, for example, a customer care representative provisioning a new phone, either at the point of sale, or during a subscriber call to a customer care center. Yet another situation when the upgrading and provisioning action is triggered may be, for example, when a carrier administrator issues a request to initialize or upgrade a collection of devices, perhaps due to a desire to upgrade the firmware of a specific set of devices. In such situations, the request may be first handled by some higher level software that may have the ability to handle the scheduling of such operations, implement some type of "throttling" to prevent network overload, and resolve the request down to the set of mobile numbers used to contact the required devices.

A list of one or more mobile phone numbers representing subscribers whose devices are to be provisioned and/or upgraded may be passed to the broker 101. The broker 101 may then detect and/or update the device and its capabilities, and create the final bundle of operations needed to bring the device to the required state. Prior to creating the final bundle, the broker 101 may invoke the OMA DM server 109 to retrieve device information such as, for example, the device ID, make, model, and version information that may be used to transform the bundle into final form.

The broker 101 may use the bundle manager 105 to translate the template bundle to final form. During this process, the bundle manager 105 may use, for example, the mobile phone number to retrieve subscriber-specific information from the carrier's subscriber manager component 107. The bundle manager's interface to the subscriber manager 107 may provide such information, for example, as what applications to provision (e.g., bookmarks, MMS, personal information manager (PIM) Sync, etc.) and to retrieve subscriber-specific values (e.g., email user ID and password) wherever identified by placeholders within the bundle template.

Figure 3:
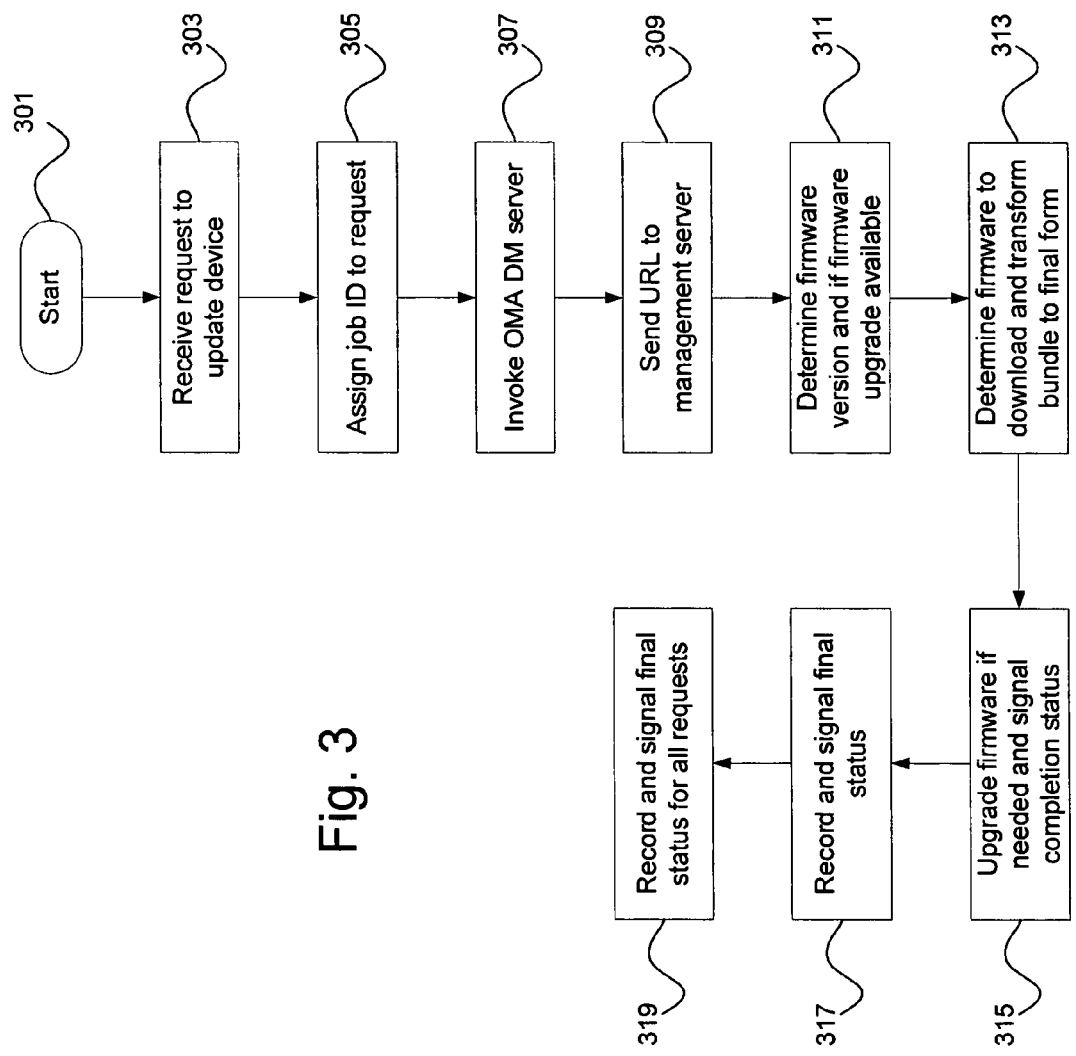
FIG. 3 illustrates a flow diagram of an exemplary process during the execution of a device initialization or update job by a broker, in accordance with an embodiment of the present invention.

FIG. 3 illustrates a flow diagram of an exemplary process that may be used during the execution of a device initialization or update job by a broker, in accordance with an embodiment of the present invention. The process may begin at a start block 301. At a next step 303, a broker such as, for example, the broker 101 of FIG. 1 may receive a request to update one or more mobile handsets as identified by, for example, their subscribers' mobile phone numbers. The mobile phone number may provide data for both a short message service (SMS) push to initiate a subsequent OMA DM session and also a link back to the carrier's subscriber management service for retrieving subscriber provisioning options as well as subscriber specific data values. The broker 101 may then, at a next block 305, assign a unique job ID to the request and return the ID for the purpose of identifying status information related to the job created.

At a next block 307, the broker 101 may invoke an OMA DM server such as, for example, the OMA DM server 109 to retrieve device information such as, for example, the device ID, make, model, and all appropriate software and firmware version information. Through the DM server, the broker 101 may then, at a next step 309, send the management server (MS) 103 a URL through which the management server 103 may contact the broker 101 for "further instructions" after the current OMA DM session. This URL "callback" from the device may provide the basic mechanism by which the broker 101 requests that the device perform subsequent DM sessions or OMA download operations, without the use of an additional SMS push notification.

The device and version ID results retrieved from the MS 103 by the DM session may then be used by the broker 101 at a next step 311 to determine what firmware version the device may already have, and whether there may be a firmware upgrade pending for that device. This information may then be passed to the bundle manager 105 at a next step 313 to determine what firmware (if any) may be downloaded and installed, and to transform the template bundle into final form, based on the resulting set of device capabilities and applicable user settings as retrieved by the bundle manager 105 from the subscriber manager 107. When the MS 103 invokes the URL passed to it, the broker 101 may defer its response until it receives the results used to create the final bundle. When the URL is posted and the final bundle is created, the broker 101 may be ready to proceed to the next step, which may depend on the response received by the broker 101. The response may be a request to initiate a new OMA DM session through which the MS 103 may receive the next set of "instructions" (e.g., to perform a firmware upgrade); a request to initiate a download operation from a specified URL; or a signal that there are no further operations to be performed.

If a device requires a firmware upgrade, the MS 103 may be instructed to initiate a DM session where the firmware upgrade instructions are provided at a next step 315. In this case, the firmware upgrade may proceed, and when completed, the MS 103 may signal a completion status to the broker 101, which may receive "further instructions" (e.g., additional steps to be executed within the bundle sequence).

If a firmware upgrade is performed, it may be the first step executed in the bundle sequence, to ensure that the device has the necessary capabilities to be able to process the subsequent steps in the sequence as intended. A subsequent step may be, for example, performing an OMA download from a specific URL, where the broker 101 may simply provide the MS with the appropriate URL, and the MS 103 may be responsible for contacting the download server. Upon completion, the MS 103 may again post the broker's status URL to report status and get its next instruction (or completion) as the response. Another subsequent step may be, for example, starting an OMA DM session for the purpose of provisioning application parameters that may be provisioned using the OMA DM protocol, where the broker 101 may invoke the OMA DM sever 109 to create a "pending" session in which the DM server may wait for the MS 103 to initiate the DM session. Upon completion of this session, the MS 103 may again post the broker 101 with status and get its next instruction as a response. Yet another subsequent step may be, for example, calling an external OMA client-provisioning server for the purpose of provisioning application parameters that are to be provisioned using OMA client provisioning. The client provisioning server may report completion upon successfully issuing a SMS message to the MS 103. Additionally, if there is more work to be done, a new OMA DM session may be initiated using the OMA DM server 109 to reestablish communication and continue the provisioning process.

Once the last operation is completed, the broker 101 may record the final status and respond to the MS 103 that there are no further instructions to be processed, at a next step 317. Once all operations are complete for all devices in a given job, at a next step 319, the broker 101 may report final status for the job back to the request initiator via a callback to a location such as, for example, a URL provided by the requestor at request initiation time. Using the job ID, the requestor may also request "current" status of the request at any time to monitor progress in terms of how each device has progressed through each step in its sequence of operations.

Referring again to FIG. 1, the broker 101 may be installed such that it interacts with the device management server (DM Server) 109, the bundle manager (BM) 105, and the scheduling manager (SM) 111. As such, application programming interfaces (APIs) for each of these three interfaces may make it possible to exchange data between the entities. The broker 101 may also interact with the DM server 109, the client provisioning server 113, the download server 115, etc.

In an embodiment of the present invention, the broker 101 interface to the DM server 109 may support several APIs. One such API may make it possible to communicate an XML-based set of commands that the broker 101 may want the DM server 109 to execute, wherein the XML may comprise a collection of commands such as, for example, Get, Replace, Exec, etc. The Get command may be associated, for example, with a uniform resource identifier (URI), in which case, the data in the client at that URI may be retrieved and returned to the broker 101. The following command may initiate communication with the DM server 109:

sendDMMessage (String transactionID, String XML):
returns a String requested

The following is an example of a set of commands associated with this interface:

<DMMessage>
<Cmd type="Replace">
<uri>./FwUpdate/x/PkgURL<uri>
<data>http://www.bitfone.com/updates/prism</data>
</Cmd>
<Cmd type="Exec">
<uri>./FwUpdate/x/Download<uri>
</data>
</Cmd>
<Cmd type="Get">
<uri>./FwUpdate/x/StatusURL<uri>
</data>
</Cmd>
<Cmd type="Get">
<uri>./SyncML/DMAcc/x/UserName<uri>
</data>
</Cmd>
<Cmd type="Get">
<uri>./SyncML/DMAcc/x/ConRef<uri>
</data>
</Cmd>
</DMMessage>

Where, the values retrieved by the Get commands may be returned as name value pairs. The parameter String transactionID may be associated with the results returned.

Another API command may be, for example, retrieveStatus (String requestIDs), which may make it possible to retrieve status for specific requestIDs. When the broker 101 wishes to know the status of tasks that have been initiated on the DM server 109 for which status information may not have been retrieved yet, the broker 101 may send a collection of requestIDs to the DM server 109 in order to determine their status. The XML document, an example of which is shown below, that may be associated as a parameter may specify requestIDs, the status for which may be retrieved:

<DMMessage>
<Cmd type=GetStatus>
<RequestId>12cdcde1</RequestId>
<RequestId>14cdcx1</RequestId>
<RequestId>24cdcx1</RequestId>
</Cmd>
</DMMessage>

Another API command such as, for example, bootstrapDevice (String transactionID, String MSISDN) may make it possible to invoke a bootstrap operation on a specific device, the MSISDN of which may be provided in the associated parameter.

In an embodiment of the present invention, the broker 101 interface to the scheduling manager 111 may support several APIs. The scheduling manager 111 may deliver references (MSISDN, for example) to individual or sets of mobile stations as targets for the delivery of bundles. Each such delivery, either individually or in a set, may be associated with a transaction ID that may be the basis of further tracking and reporting. One associated API command may be the following:

createJob(String XML_List_of MobileNumbers, String soap_callback, Boolean individual, Boolean reportOnTermination)
returns String JobId In this command, the list of mobile numbers provided as the first parameter may be used by the broker 101 as the target for bundles of firmware update, provisioning parameters and related content. The callback function provided may be used to report success or failures. If the parameter 'individual' is set to 'true', then the report may be sent for each mobile station, otherwise all reports within the 'job' may be collected and the report may be sent only once. Additionally, for the case where 'individual' is set to 'true', such reporting may be performed only after the termination of the execution of the bundles if the 'reportOnTermination' is set to 'true'. Otherwise, it may be reported once at the end of execution of every major step in the bundle.

Another associated API command may be:

reportStatus (String JobId) return String StatusInfo

The status for a specified JobId may be returned. If the JobId has a set of mobile stations associated with it, then a collection of statuses may be reported. If the JobId has only one 'individual' mobile station associated with it, then, the status for the particular mobile station may be reported In an embodiment of the present invention, the broker 101 interface to the bundle manager 105 may support several APIs. The bundle manager 105 may deliver templates for the bundles or completely instantiated bundles when device-specific information and subscriber specific information is provided. The bundles retrieved from the bundle manager 105 may be executed by the broker 101. The MSISDN of a mobile station may be known to the broker 101, but the firmware version may not be known initially. The broker 101 may retrieve the firmware version of the mobile station via, for example, the DM server 109, in order to assemble the right bundle for the mobile station. One associated API command may be the following:

getBundle (String Make, String Model, String Version, String MSISDN)
   returns String XMLBundle In this command, the make, model and version number may be provided as the first three parameters, respectively. This command may facilitate the identification of the right bundle template. The version may also be employed to determine device-specific parameters and device capabilities. The MSISDN may be provided as the fourth parameter and may make it possible to selectively retrieve user accounts from, for example, an external subscriber database or customer care system. Such user accounts may be associated with pop mail accounts, simple mail transfer protocol (SMTP) accounts, etc. The MSISDN may also be used to retrieve a list of services associated with the user account, or a list of Boolean variables that specify what services are to be incorporated. Thus, the MSISDN may be used to determine the services for which the user might have opted as a plan.

Another associated API command may be:

getBundle (String Make, String Model, String MSISDN)
   returns String XMLBundle In this command, the make and model may be provided as the first two parameters, respectively. This command may facilitate the identification of the right bundle template. The MSISDN may be used to determine the services for which the user might have opted as a plan.

Yet another associated API command may be:

getDeviceCapability (String Make, String Model, String Version)
   returns Name_Value_Pair_List In this command, the make, model and version may be provided as the parameters, and the command may facilitate the determination of capabilities of the device that are returned as a list of name value pairs, wherein the values may be Boolean variables.

In an embodiment of the present invention, a bundle may be created by the bundle manager 105 and may define the components to be provisioned. The initial bundle created may be a template bundle with placeholders for subscriber-specific information. When the final firmware version, device capabilities and subscriber preferences are known, a final bundle instance may be created. The bundle may define the steps and their order of execution for provisioning various components like software, firmware, configuration parameters, etc., across appropriate protocols. The following is an exemplary specification of the output of the creation process and how these templates may be processed into the final form:

```
Bundle DTD
<!ELEMENT bundle (bundle-info,device-info,bundle-
   components)>
<!-- bundle-info contains the meta data of the bundle. -->
<!ELEMENT bundle-info (bundle-id,bundle-name,
   bundle-description,bundle-source,date-created)>
<!-- Unique Identifier for the bundle -->
<!ELEMENT bundle-id (#PCDATA)>
<!-- Name of the bundle -->
<!ELEMENT bundle-name (#PCDATA)>
<!-- Bundle description -->
<!ELEMENT bundle-description (#PCDATA)>
<!-- The Bundle Creator location -->
<!ELEMENT bundle-source (#PCDATA)>
<!-- Date of Bundle Creation -->
<!ELEMENT date-created (#PCDATA)>
<!-- The Device type for which this bundle is created -->
<!ELEMENT device-info (manufacturer,model,source-
   version)>
<!-- supported device Manufacturer name -->
<!ELEMENT manufacturer (#PCDATA)>
<!-- Supported Device Model name(s) -->
<!ELEMENT model (#PCDATA)>
<!-- The firmware Source Version -->
<!ELEMENT source-version (#PCDATA)>
<!-- The components of a bundle -->
<!ELEMENT   bundle-components   (firmware-compo-
   nent?,software-component*,client-provisioning-com-
   ponent?,device-management-component?)>
<!-- Firmware update package information -->
<!ELEMENT firmware-component (description, target-
   version,source-url, notification-url)>
<!-- The execution order sequence -->
<!ATTLIST  firmware-component  sequence  CDATA
   #REQUIRED>
<!-- Action to take on encountering an error -->
<!ATTLIST   firmware-component   onErrorContinue
   (true|false) "false">
<!-- The target firmware description -->
<!ELEMENT fw-description (#PCDATA)>
<!-- The target firmware description -->
<!ELEMENT target-version (#PCDATA)>
<!-- The firmware update package source server uri -->
<!ELEMENT fw-source-url (#PCDATA)>
<!-- The uri of the notification server -->
<!ELEMENT fw-notification-url (#PCDATA)>
<!-- The Software/Applications component -->
<!ELEMENT   software-component   (software-name,sw-
   description, sw-source-url)>
<!-- The execution order sequence -->
<!ATTLIST   software-component   sequence   CDATA
   #REQUIRED>
<!-- Action to take on encountering an error -->
<!ATTLIST   software-component   onErrorContinue
   (true|false) "false">
<!-- The name of the software component -->
<!ELEMENT software-name (#PCDATA)>
<!-- description -->
<!ELEMENT sw-description (#PCDATA)>
<!-- The uri of the software content server -->
<!ELEMENT sw-source-url (#PCDATA)>
<!-- The OMA Client-Provisioning DTD -->
<!-- The client-provisioning-component uses the DTD
   definition specified by WAP Forum as in http://
   www.wapforum.org/DTD/prov.dtd -->
<!ENTITY   %   wap-provisioningdoc   SYSTEM
   "prov.dtd">
<!ELEMENT client-provisioning-component (% wap-
   provisioningdoc;)>
% wap-provisioningdoc;
<!-- The execution order sequence -->
<!ATTLIST  client-provisioning-component  sequence
   CDATA #REQUIRED>
<!-- Action to take on encountering an error -->
<!ATTLIST client-provisioning-component onErrorCon-
   tinue (true|false) "false">
<!ENTITY  %  MgmtTree  SYSTEM  "OMA-SyncML-
   DMDDFDTD-V1_1_2-20030508-D.dtd">
<!-- The OMA DM based provisioning -->
<!ELEMENT device-management-component (applica-
   tion*)>
```

```
<!ELEMENT application (description, Cmd*, uri*, data*,
    de)>
<!ATTLIST application name>
<!-- The execution order sequence -->
<!ATTLIST device-management-component sequence
    CDATA #REQUIRED>
<!-- Action to take on encountering an error -->
<!ATTLIST device-management-component onError-
    Continue (true|false) "false">
<!-- The SyncML command -->
<!ELEMENT Cmd (#PCDATA)>
<!ATTLIST Cmd type>
<!-- The location URI of the management object -->
<!ELEMENT uri (#PCDATA)>
<!ELEMENT data (#PCDATA)>
<!ELEMENT description (#PCDATA)>
```

The following is an exemplary bundle template with placeholders for user names and passwords:

```
<?xml version="1.0" encoding="UTF-8"?>
<!DOCTYPE bundle SYSTEM "Bundle.dtd">
<bundle>
<bundle-info>
    <bundle-id>1234</bundle-id>
    <bundle-name>phone-bundle-template</bundle-
        name>
    <bundle-description>This is a template</bundle-de-
        scription>
    <bundle-source>http://hostname:port/bundleMan-
        ager</bundle-source>
    <date-created>01-11-2003</date-created>
</bundle-info>
<device-info>
    <manufacturer>Man A</manufacturer>
    <model>Model B</model>
    <source-version1.2.3</source-version>
</device-info>
<bundle-components>
    <firmware-component                sequence="0"
        onErrorContinue="false">
    <fw-description>New firmware update package</fw-
        description>
    <target-version1.2.4</target-version>
    <fw-source-url>http://host:port/prism</fw-source-url>
    <fw-notification-url>http://host:port/broker</fw-noti-
        fication-url>
</firmware-component>
<software-component                sequence="1"
    onErrorContinue="false">
    <software-name>Tetris</software-name>
    <sw-description>A New Game</sw-description>
    <sw-source-url>http://host/OMA-DL-Server</sw-
        source-url>
</software-component>
<client-provisioning-component        sequence="2"
    onErrorContinue="false">
    <wap-provisioningdoc>
<characteristic type="BOOTSTRAP">
    <parm name="CONTEXT-ALLOW" value="0"/>
    <parm name="PROVURL" value="http://www.opera-
        tor.com/TPS/"/>
</characteristic>
<characteristic type="PXLOGICAL">
    <parm name="PROXY-ID" value="170.187.51.4"/>
    <parm name="NAME" value="BankMainProxy"/>
    <parm      name="STARTPAGE"       value="http://
        www.bank.com/startpage.wml"/>
<characteristic type="PXAUTHINFO">
    <parm   name="PXAUTH-TYPE"    value="HTTP-
        BASIC"/>
    <parm               name="PXAUTH-ID"
        value="#PXUSERNAME#"/>
    <parm               name="PXAUTH-PW"
        value="#PXUSERPASSW#"/>
</characteristic>
<characteristic type="PXPHYSICAL">
    <parm          name="PHYSICAL-PROXY-ID"
        value="PROXY 1"/>
    <parm    name="DOMAIN"    value="www.bank.
        com/"/>
    <parm name="PXADDR" value="170.187.51.3"/>
    <parm name="PXADDRTYPE" value="IPV4"/>
    <parm name="TO-NAPID" value="INTERNET"/>
    <parm name="TO-NAPID" value="NAP1"/>
    <characteristic type="PORT">
        <parm name="PORTNBR" value="9203"/>
    </characteristic>
</characteristic>
</characteristic>
<characteristic type="APPLICATION">
    <parm name="APPID" value="110"/>
    <parm name="PROVIDER-ID" value="MyMail"/>
    <parm name="TO-NAPID" value="IAP1"/>
    <characteristic type="APPADDR">
        <parm name="ADDR" value="pop.mail.com"/>
        <characteristic type="PORT">
            <parm name="PORTNBR" value="110"/>
            <parm name="SERVICE" value="STARTTLS"/>
        </characteristic>
    </characteristic>
    <characteristic type="APPAUTH">
        <parm   name="AAUTHTYPE"   value="CRAM-
            MD5"/>
        <parm               name="AAUTHNAME"
            value="#USERNAME#"/>
        <parm               name="AAUTHSECRET"
            value="#PASSWORD#"/>
    </characteristic>
</characteristic>
</wap-provisioningdoc>
</client-provisioning-component>
<device-management-component         sequence="3"
    onErrorContinue="false">
<application name="Email">
    <description>Email Application settings</description>
    <Cmd type="Replace">
    <uri>./Application/EMAIL/NAP-Addr</uri>
    <data></data>
    </Cmd>
</application>
</device-management-component>
</bundle-components>
</bundle>
```

A "final form" bundle may have all the placeholders filled in. The following exemplary code tells the broker 101 to update the firmware from source version 1.2.3 to 1.2.5, provision the EMAIL Settings using OMA Client Provisioning protocol and install a new game:

```
<?xml version="1.0" encoding="UTF-8"?>
<!DOCTYPE bundle SYSTEM "Bundle.dtd">
<bundle>
<bundle-info>
    <bundle-id>345</bundle-id>
    <bundle-name>Bundle1</bundle-name>
```

```
<bundle-description>Updates the firmware, installs a
    new game and provisions EMAIL settings using
    OMA CP</bundle-description>
<bundle-source>http://host:port/bundleManager</
    bundle-source>
<date-created>01-11-2003</date-created>
</bundle-info>
<device-info>
  <manufacturer>Man A</manufacturer>
  <model>Mdl B</model>
  <source-version>1.2.3</source-version>
</device-info>
<bundle-components>
  <firmware-component            sequence="0"
      onErrorContinue="false">
    <fw-description>New firmware from Generator</
        fw-description>
    <target-version>1.2.5</target-version>
    <fw-source-url>http://bitfone/prism</fw-source-
        url>
    <fw-notification-url>http://bitfone/prism/notify</
        fw-notification-url>
  </firmware-component>
  <client-provisioning-component    sequence="1"
      onErrorContinue="false">
    <wap-provisioningdoc>
    <characteristic type="BOOTSTRAP">
      <parm name="CONTEXT-ALLOW" value="0"/>
      <parm name="PROVURL" value="http://www.op-
          erator.com/TPS/"/>
    </characteristic>
    <characteristic type="PXLOGICAL">
      <parm name="PROXY-ID" value="170.187.51.4"/>
      <parm name="NAME" value="BankMainProxy"/>
      <parm   name="STARTPAGE"   value="http://
          www.bank.com/startpage.wml"/>
      <characteristic type="PXAUTHINFO">
        <parm name="PXAUTH-TYPE" value="HTTP-
            BASIC"/>
        <parm            name="PXAUTH-ID"
            value="pxusername"/>
        <parm            name="PXAUTH-PW"
            value="pxuserpassw"/>
      </characteristic>
      <characteristic type="PXPHYSICAL">
        <parm    name="PHYSICAL-PROXY-ID"
            value="PROXY 1"/>
        <parm             name="DOMAIN"
            value="www.bank.com/"/>
        <parm              name="PXADDR"
            value="170.187.51.3"/>
        <parm name="PXADDRTYPE" value="IPV4"/>
        <parm            name="TO-NAPID"
            value="INTERNET"/>
        <parm name="TO-NAPID" value="NAP1"/>
        <characteristic type="PORT">
          <parm name="PORTNBR" value="9203"/>
        </characteristic>
      </characteristic>
    </characteristic>
    <characteristic type="APPLICATION">
      <parm name="APPID" value="25"/>
      <parm name="PROVIDER-ID" value="MyMail"/>
      <parm name="TO-NAPID" value="IAP1"/>
      <parm              name="FROM"
          value="first.second@mymail.com"/>
      <characteristic type="APPADDR">
        <parm name="ADDR" value="smtp.mail.com"/>
        <characteristic type="PORT">
          <parm name="PORTNBR" value="25"/>
          <parm             name="SERVICE"
              value="STARTTLS"/>
        </characteristic>
      </characteristic>
      <characteristic type="APPAUTH">
        <parm name="AAUTHTYPE" value="CRAM-
            MD5"/>
        <parm             name="AAUTHNAME"
            value="username-value"/>
        <parm             name="AAUTHSECRET"
            value="password-value"/>
      </characteristic>
    </characteristic>
    </wap-provisioningdoc>
  </client-provisioning-component>
  <software-component            sequence="2"
      onErrorContinue="false">
    <software-name>tetris</software-name>
    <sw-description>A new game</sw-description>
    <sw-source-url>http://host/oma-dl-server</sw-source-
        url>
  </software-component>
</bundle-components>
</bundle>
```

The following exemplary bundle specifies to update the firmware from source version 1.2.3 to 1.2.5, provisions the EMAIL Settings using OMA DM and install a new game:

```
<?xml version="1.0" encoding="UTF-8"?>
<!DOCTYPE bundle SYSTEM "Bundle.dtd">
<bundle>
<bundle-info>
  <bundle-id>678</bundle-id>
  <bundle-name>Bundle2</bundle-name>
  <bundle-description>Updates the firmware, installs a
      new game and provisions EMAIL settings using
      OMA DM</bundle-description>
  <bundle-source>http://host:port/bundleManager</
      bundle-source>
  <date-created>01-11-2003</date-created>
</bundle-info>
<device-info>
<manufacturer>Man C</manufacturer>
<model>Mdl D</model>
<source-version1.2.3</source-version>
</device-info>
<bundle-components>
  <firmware-component            sequence="0"
      onErrorContinue="false">
    <fw-description>New firmware from Generator</
        fw-description>
    <target-version1.2.5</target-version>
    <fw-source-url>http://bitfone/prism</fw-source-
        url>
    <fw-notification-url>http://bitfone/prism/notify</
        fw-notification-url>
  </firmware-component>
  <device-management-component    sequence="1"
      onErrorContinue="false">
```

```xml
<application name="Email">
    <description>Email Application settings</description>
    <Cmd type="Replace">
        <uri>./Application/EMAIL/NAP-Addr</uri>
        <data>Address Value</data>
    </Cmd>
</application>
</device-management-component>
<software-component sequence="2" onErrorContinue="false">
    <software-name>tetris</software-name>
    <sw-description>A new game</sw-description>
    <sw-source-url>http://host/oma-dl-server</sw-source-url>
</software-component>
</bundle-components>
</bundle>
```

Figure 4:
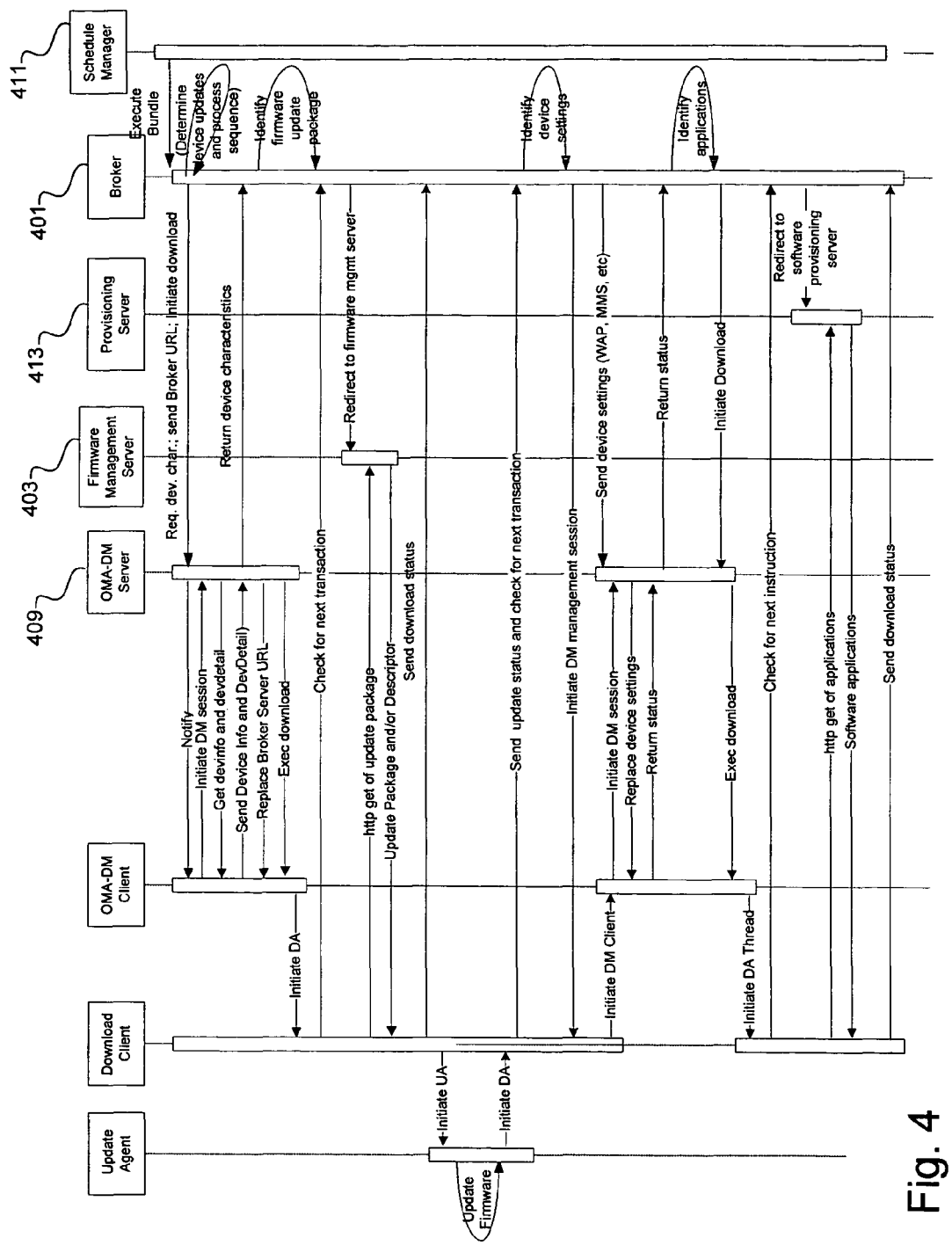
FIG. 4 illustrates a flow diagram showing various exemplary interactions involved in the process of executing bundles to update firmware/software and provision applications in a mobile device, in accordance with an embodiment of the present invention.

FIG. 4 illustrates a flow diagram showing various exemplary interactions involved in the process of executing bundles to update firmware/software and provision applications in a mobile handset, in accordance with an embodiment of the present invention. The broker 401 may be, for example, the broker 101 of FIG. 1. Additionally, the firmware management server 403, the OMA-DM server 409, and the provisioning server 413, may correspond, for example, to the management server 103, the OMA-DM server 109, and the client provisioning server 113 of FIG. 1, respectively. The schedule manager 411 may correspond, for example, to the scheduling manager 111 of FIG. 1.

The present invention may be realized in hardware, software, firmware and/or a combination thereof: The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network that facilitates managing associated electronic devices, the network comprising:
    a management server that manages the electronic devices in the network;
    a first manager that creates template bundles of actions for the electronic devices; and
    a broker that:
        retrieves, from a subscriber server, subscriber-specific information for the electronic devices, wherein the subscriber-specific information includes user identifications and user passwords;
        selects an appropriate template bundle of actions from the template bundles;
        determines a sequence of execution of the actions of the appropriate template bundle of actions in the electronic devices, wherein the broker utilizes the management server to interact with the electronic devices;
        inserts the subscriber-specific information into placeholders in the template bundle of actions;
        determines the sequence of execution of the actions; and
        transforms the appropriate template bundle of actions into a final bundle of actions, based on the information retrieved.

2. The network according to claim 1 wherein the actions comprise electronic device management and provisioning activities.

3. The network according to claim 1 wherein the broker determines the sequence in which the electronic devices receive the bundles of actions for execution.

4. The network according to claim 1 wherein the final bundle of actions comprises an extensible markup language (XML) document that specifies a sequence of operations to be executed by recipient electronic devices.

5. The network according to claim 1 wherein the broker receives a signal from each electronic device upon completion of execution of the actions in the electronic device.

6. The network according to claim 5 wherein the broker signals to the management server the completion of execution of actions in the electronic devices.

7. The network according to claim 1 wherein an electronic device comprises at least one of a mobile handset, a cellular telephone, a pager, a personal computer, and a personal digital assistant (PDA).

8. A method that facilitates managing associated plurality of electronic devices, the method comprising:
    creating template bundles of actions for the plurality of electronic devices to perform;
    receiving a request to update at least one of the plurality of electronic devices;
    retrieving, from a subscriber server, information about the plurality of electronic devices and subscriber-specific information for the plurality of electronic devices, wherein the subscriber-specific information includes user identifications and user passwords;
    selecting an appropriate template bundle of actions from the template bundles based on the retrieved information;
    substituting the subscriber-specific information for placeholder tokens in the template bundles;
    determining a sequence of execution of the actions in each of the at least one of the plurality of electronic devices, using the retrieved information;
    transforming the selected appropriate template bundle of actions into a final bundle of actions, based on the retrieved information;

reporting an intermediate status of the execution of the actions from the final bundle of actions in each of the at least one of the plurality of electronic devices; and signaling completion of the execution of the actions from the final bundle of actions in each of the at least one of the plurality of electronic devices.

9. The method according to claim 8 wherein the actions comprise updating firmware in the at least one of the plurality of electronic devices.

10. The method according to claim 8 comprising utilizing information retrieved from the at least one of the plurality of electronic devices to determine the sequence of execution of the actions.

11. The method according to claim 8 comprising determining the sequence in which the at least one of the plurality of electronic devices receive the final bundles of actions for execution.

12. The method according to claim 8 wherein the final bundle of actions comprises an extensible markup language (XML) document that specifies a sequence of operations to be executed by recipient electronic devices.

13. The method according to claim 8 wherein an electronic device comprises at least one of a mobile handset, a cellular telephone, a pager, a personal computer, and a personal digital assistant (PDA).

14. The method according to claim 8 wherein the subscriber-specific information includes email user identifications and applicable user settings for the at least one of the plurality of electronic devices.

15. The network according to claim 1 wherein:
the broker receives a list of mobile phone numbers associated with the electronic devices, and
the broker provides a mobile phone number to the subscriber server to retrieve the subscriber-specific information from the subscriber server.

16. The method according to claim 8 further comprising:
receiving a list of mobile phone numbers associated with the electronic devices, and
providing a mobile phone number to the subscriber server to retrieve the subscriber-specific information from the subscriber server.

* * * * *